June 29, 1971 — R. L. BANKS — 3,590,096
CONVERSION OF ISOBUTENE TO ISOAMYLENE

Filed April 18, 1968 — 2 Sheets-Sheet 1

INVENTOR.
R. L. BANKS
BY *Young & Quigg*
ATTORNEYS

June 29, 1971   R. L. BANKS   3,590,096
CONVERSION OF ISOBUTENE TO ISOAMYLENE
Filed April 18, 1968   2 Sheets-Sheet 2

INVENTOR.
R. L. BANKS
BY Young & Quigg
ATTORNEYS

United States Patent Office 3,590,096
Patented June 29, 1971

3,590,096
CONVERSION OF ISOBUTENE TO ISOAMYLENE
Robert L. Banks, Bartlesville, Okla., assignor to
Phillips Petroleum Company
Filed Apr. 18, 1968, Ser. No. 722,262
Int. Cl. C07c 3/62
U.S. Cl. 260—683                                9 Claims

ABSTRACT OF THE DISCLOSURE

Isobutene is reacted with n-butene and/or propylene to produce isoamylenes. By-product ethylene and/or propylene is converted to useful higher molecular weight olefins by one or more of the following steps:
 (a) By-product propylene is disproportionated to ethylene and additional butenes,
 (b) By-product ethylene is converted to additional propylene and butenes, and
 (c) By-product ethylene and propylene in admixture is converted to additional isoamylenes.

---

Figure 1:
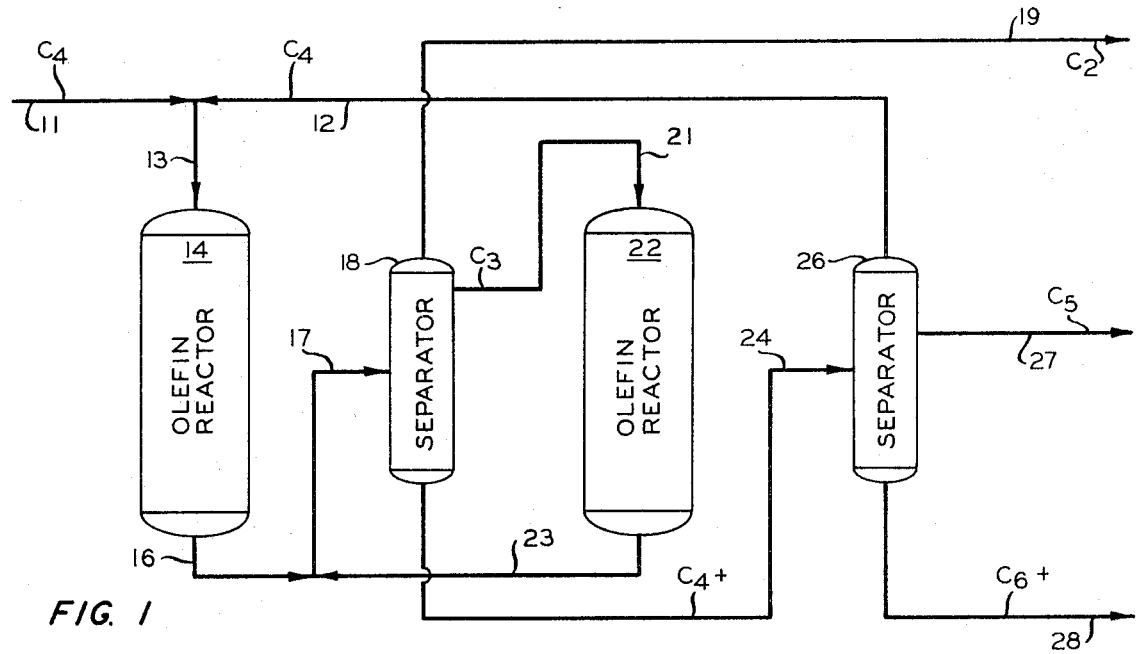

This invention relates to producing isoamylenes from a mixed feed stream comprising isobutene and at least one other olefin hydrocarbon. In one aspect, it relates to producing isoamylenes from mixed butenes. In another aspect it relates to producing isoamylenes from a mixed feed stream comprising isobutene and propylene.

Isoamylene is a valuable intermediate for the production of isoprene, and is a desirable product to produce from relatively inexpensive and readily available feed stocks such as a mixed stream comprising butenes and isobutylene or a mixed stream comprising propylene and isobutylene.

An object of this invention is to produce isoamylenes from a mixed stream comprising isobutene and n-butenes. Another object of this invention is to produce isoamylene from a mixed feed stream comprising isobutene and propylene. Other aspects, objects and the advantages of my invention are apparent from the written description, the drawing, and the claims.

According to the invention, isoamylene is produced from a feed stream comprising isobutene and either n-butene or propylene by reacting the mixed feed stream in a first olefin reaction zone to produce isoamylene and a by-product comprising ethylene or propylene, and reacting the by-product to produce additional olefin hydrocarbons having a larger number of carbon atoms per molecule than the by-product. Further according to the invention, a stream comprising mixed isobutene and n-butene is converted in an olefin reaction zone to produce isoamylene and propylene, the propylene is disproportionated to produce additional butene and the butene thus produced is recycled to the first olefin reaction zone. Further according to the invention, a mixed stream comprising isobutene and propylene is reacted in an olefin reaction zone to produce isoamylene and ethylene and the ethylene is converted to produce additional propylene which is recycled to the olefin reaction zone. Further according to the invention, ethylene and propylene produced in the reaction of the feed stream to produce isoamylene are further reacted to produce additional isoamylene. Further according to the invention, ethylene and $C_6$ or heavier olefins produced in the process are reacted together in a second olefin reaction zone to produce olefin hydrocarbons lighter than isoamylene which are recycled to the feed stream reaction zone. A feature of the invention is that ethylene and/or propylene which are produced as by-products are returned to the process by conversion to other olefins and ultimately result in the production of additional isoamylenes.

Processes have recently been discovered wherein olefinically unsaturated compounds are converted into other olefinic compounds by a reaction called the "olefin reaction." The term "olefin reaction," as used herein, is defined as a process for the catalytic conversion over a catalyst of a feed comprising one or more ethylenically unsaturated compounds to produce a resulting product which contains at least 10 percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated compounds, and compounds which can be visualized as formed by skeletal isomerization but which cannot be visualized as formed by one or more of the above-noted reactions, comprises less than 25 percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or in different molecules.

The olefin reaction, as used in the present invention, is illustrated by the following reactions:

(1) The disproportionation of an acyclic mono- or polyene having at least 3 carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having 3 or more carbon atoms and a different acyclic mono- or polyene having 3 or more carbon atoms to produce different acyclic olefins; for example, the conversion of butene-2 and isobutylene yields propylene and isopentene; and (3) The conversion of ethylene and an internal acyclic mono- or polyene having 4 or more carbon atoms to produce other olefins having a lower number of carbon atoms than that of the acyclic mono- or polyenes; for example, the conversion of ethylene and 4-methylpentene-2 yields propylene and 2-methylbutene-1.

The catalysts which are applicable in the present invention include all of those which have activity for the disproportionation of propylene to ethylene and butene. Some examples of such catalysts are:

(1) Silica or thoria promoted by an oxide or a compound convertible to the oxide by calcination of tungsten, molybdenum, rhenium or tellurium or by a sulfide of tungsten or molybdenum;

(2) Alumina promoted by an oxide or compound convertible to an oxide by calcination of molybdenum, tungsten, or rhenium; by a sulfide of tungsten or molybdenum; or by an alkali metal salt, ammonium salt, alkaline earth metal salt, or bismuth salt of phosphomolybdic acid;

(3) One or more of the group aluminum phosphate, zirconium phosphate, calcium phosphate, magnesium phosphate, or titanium phosphate promoted by one or more of a sulfide of molybdenum or tungsten, or by an oxide or a compound convertible to an oxide by calcination of molybdenum, tungsten or rhenium or by magnesium tungstate or beryllium phosphotungstate;

(4) Silica, alumina, aluminum phosphate, zirconium phosphate, calcium phosphate, magnesium phosphate, or titanium phosphate promoted by a hexacarbonyl of molybdenum or tungsten; and (5) Homogeneous olefin reaction catalysts where appropriate. In such embodiments, catalyst removal and/or recovery steps normally are required. For example, transition metal-containing homogeneous catalyst systems, active for the disproportionation of olefins, can be used. An example of one such catalyst system is bis(triphenylphosphine)dinitrodyldichloromolybdenum and methylaluminum sesquichloride which can be used at atmospheric pressure, room temperature, and preferably in the presence of a reaction diluent. Some suitable homogeneous catalyst systems are disclosed and claimed in U.S. Ser. Nos. 635,649 (now abandoned), 635,657 (now abandoned), 635,669 (now abandoned), 635,693 (now abandoned), 635,708, filed May 3, 1967; 694,872 (now abandoned), 694,873 (now abandoned), 694,874, filed Jan. 2, 1968; and 696,109 (now abandoned), filed Jan. 8, 1968.

The catalysts of (1) can be prepared and activated by conventional techniques such as by combining a catalyst grade silica with a suitable tungsten, molybdenum, rhenium or, tellurium, compound by a conventional method such as, for example, impregnation, dry mixing or coprecipitation. Suitable tungsten and molybdenum compounds include tungsten oxide and molybdenum oxide and compounds convertible to the oxide, tungsten sulfide and molybdenum sulfide. The supported oxides and compounds convertible to the oxide are activated by calcining in air, and the supported sulfides are activated by heating in an inert atmosphere.

The catalysts of (2) can be prepared and activated by conventional techniques such as by combining catalyst grade alumina with an oxide or compound convertible to an oxide by calcination of molybdenum, tungsten or rhenium and calcining the resulting mixture after removal of any solvent used in the impregnation. The sulfides of tungsten or molybdenum or the salts of phosphomolybdic acid can be utilized to impregnate a catalyst grade alumina by solution in a proper solvent after which the solvent is evaporated and the resulting mixture dried to prepare the catalyst.

The catalyst compositions of (3) can be prepared and activated by conventional techniques. For example, molybdenum oxide can be coprecipitated with aluminum phosphate, followed by calcination in air to produce an activated catalyst. Alternatively, the support material can be impregnated with a compound of the promoter convertible to the oxide, such as ammonium tungstate, followed by calcination in air. In the preparation of a sulfide-containing catalyst, a sulfide of the promoter can be ball milled with a support such as zirconium phosphate, followed by heating in an inert atmosphere such as nitrogen. Magnesium tungstate and beryllium phosphotungstate can be dry mixed with titanium phosphate, for example, and activated by calcination in air at elevated temperatures.

The catalyst compositions of (4) can be prepared and activated by impregnating a previously calcined support material such as calcium phosphate with a solution of the hexacarbonyl of the promoter in an organic solvent, such as benzene, followed by drying in a vacuum or in an inert atmosphere at about 50 to 700° F.

The catalyst compositions of (5) can be prepared by simple combination of the transition metal compound with a suitable adjuvant, such as, for example, an organoaluminum halide, under conditions suitable to provide a catalyst active for the olefin reaction.

The solid catalytic agent is considered to be the reaction product resulting from the admixture of the support material and the promoter material and any subsequent activation treatment.

The operating temperature for the olefin reaction is generally in the range of about 0 to 1200° F. When using the catalysts of (1), it is in the range of about 400 to about 1100° F.; when using the catalysts of (2), in the range of about 150 to 500° F.; when using the catalysts of (3), in the range of about 600 to 1200° F.; when using the catalysts of (4), in the range of about 0 to 600° F.; when using the catalysts of (5), in the range of about −20 to 170° F. In the olefin reaction process, generally the pressure is not critical except with respect to the state of the materials in the reaction zone and with respect to conditions up and downstream from the reaction zone, but generally the pressure is in the range of 0 to 2000 p.s.i.g.

The solid catalysts of the olefin reaction can be in the form of a powder, or granules, as well as in other shapes, such as agglomerates, pellets, spheres, extrudates, beads, and other forms depending upon the type of contacting technique utilized.

With a fixed bed reactor and continuous operation, weight hourly space velocity in the range of about 0.5 to 1000 parts by weight of hydrocarbon feed per part by weight of catalyst per hour (WHSV) are suitable, and excellent results have been obtained in the range of 1 to 200 WHSV.

It is frequently advantageous to associate double bond isomerization with the olefin reaction. This can be done by providing a combined catalyst system which contains both an olefin reaction catalyst and a double bond isomerization catalyst. In one such system, the olefin feed sequentially contacts an isomerization catalyst and an olefin reaction catalyst. In another such system, the feed contacts a compatible mixture of such catalysts. A convenient combined catalyst system of this type is a fixed bed system containing an intimate physical mixture of a particulate olefin reaction catalyst and a particulate isomerization catalyst. When air activated refractory oxide olefin reaction catalysts are used, metal oxide isomerization catalysts such as MgO, ZnO, etc., are particularly appropriate.

Depending upon the specific feed materials and the specific catalysts being used, any conventional contacting technique can be utilized, such as fixed bed reaction, fluidized bed reaction, liquid phase batch reaction, and the like.

At the completion of the reaction, the reaction mixture can be processed to recover any desired product by any conventional means such as fractionation, crystallization, absorption, and the like. Unreacted material or products not in the desired molecular weight range can be recycled.

Ethylene and propylene can be reacted in a co-dimerization unit to produce isoamylenes. Any catalyst suitable for the reaction can be selected from those known to have a catalytic effect for olefin dimerization, including, for example, silica, silica-alumina, acidized silica or silica-alumina, organic halide-treated silica or silica-alumina, supported phosphoric acid, $P_2O_5$, molybdic oxide, tungstic oxide, nickel oxide on silica or silica-alumina, etc. Conditions are selected to optimize the desired reaction.

Ethylene can be reacted to produce propylene. For example, as disclosed in Ser. No. 423,205, filed Jan. 4, 1965, ethylene is converted to propylene by contact with a tungsten oxide or molybdenum oxide promoted silica catalyst. Such a catalyst normally comprises silica which has been promoted with from about 0.1 to about 30 weight percent of tungsten oxide, molybdenum oxide, or mixtures thereof. Preferably, the catalyst contains from about 1 to about 20 weight percent of the promoter and excellent results are obtained with 2 to 4 weight percent of the promoted oxide. The temperature of the process preferably is in the range of about 600 to about 1100° F., more preferably 800 to about 1000° F., and the pressures are from about 0 to about 1500 p.s.i.g., preferably 0 to 500 p.s.i.g. Gaseous space velocity in the range of 6 to about 10,000 vol./vol./hr. or higher are used.

The reaction of ethylene and a heavier olefin hydrocarbon is disclosed in Ser. No. 516,673, filed Dec. 27, 1965, now Pat. No. 3,431,316. Suitable catalysts include those which show activity for disproportionating olefins into olefins of higher and lower molecular weight. Some suitable catalysts are disclosed in U.S. Pat. No. 3,261,879, issued July 19, 1966, U.S. 3,365,513, issued Jan. 23, 1968, and elsewhere. Conditions for the reaction are those suitable for the disproportionation of olefins.

Figure 2:
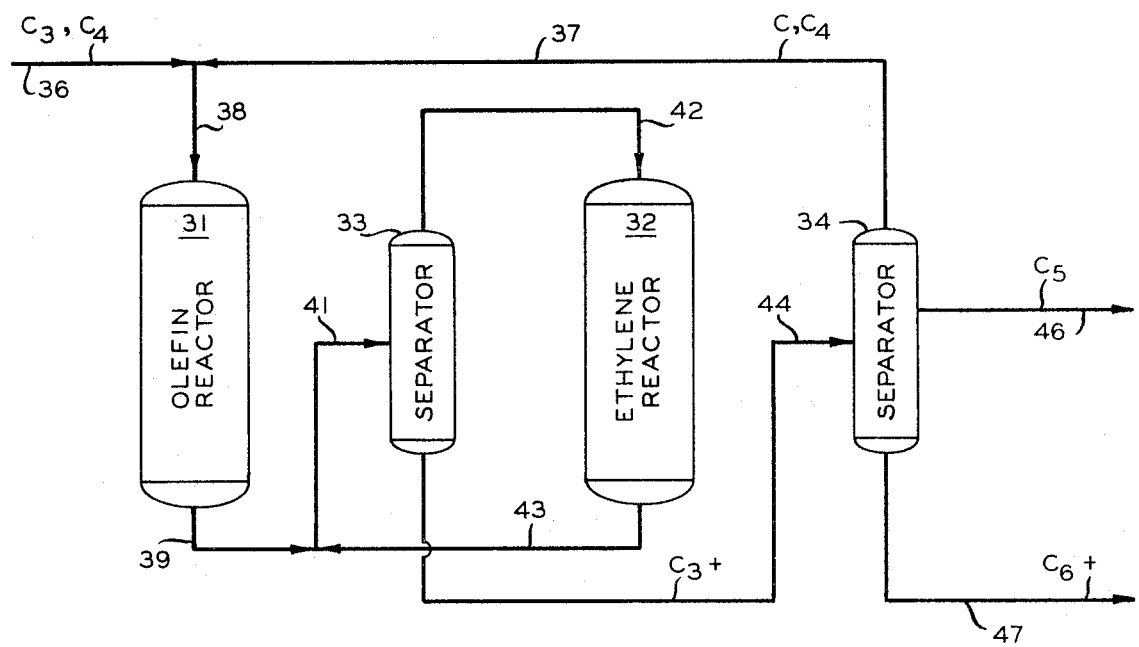
Figure 3:
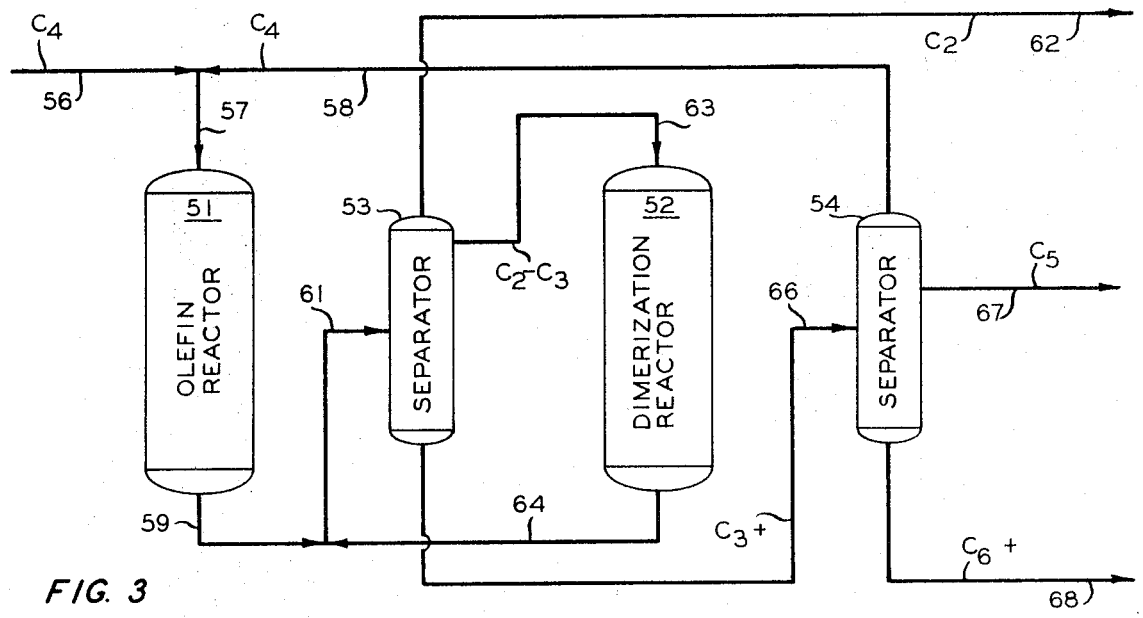
Figure 4:
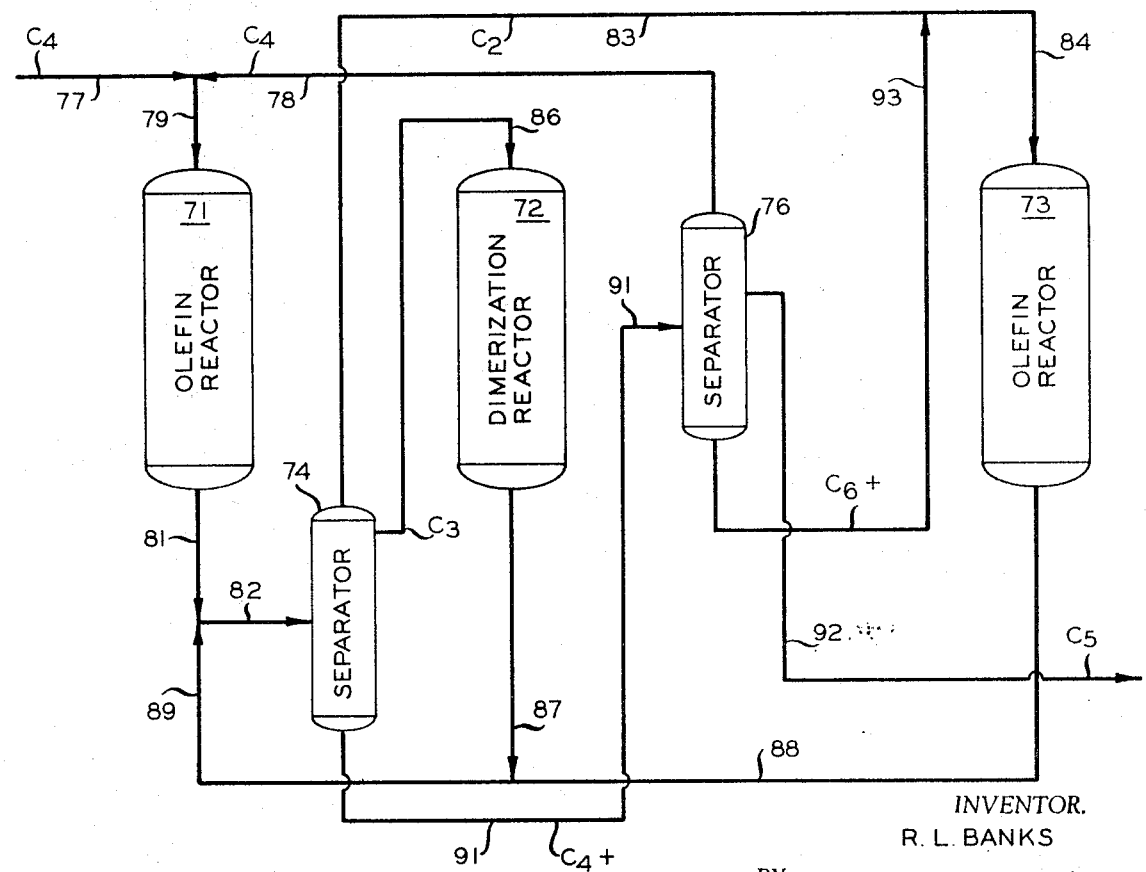

In the drawing, FIG. 1 illustrates the operation of the invention wherein mixed butenes are reacted in a first olefin reactor and by-product propylene is reacted in a second olefin reactor to produce additional butene which is recycled to the first olefin reactor. FIG. 2 illustrates the operation of the invention wherein propylene and isobutene are reacted in the olefin reactor and by-product ethylene is converted to produce additional propylene in the ethylene reactor. FIG. 3 illustrates the operation of the invention wherein ethylene and propylene by-product is dimerized and the effluent recycled to the olefin reactor. FIG. 4 illustrates the operation of the invention wherein by-product ethylene and $C_6$ and heavier olefins are reacted to produce lighter olefins for recycle.

In the practice of the invention as illustrated in FIG. 1, a mixed butene feed stock, preferably containing about 50 mol percent or more isobutene, is contacted together with recycle mixed butenes with an olefin disproportionation catalyst under reaction conditions suitable to form a substantial amount of isoamylene. The effluent from the mixed butene reaction unit contains significant amounts of both ethylene and propylene. In this embodiment, ethylene can be removed from the process while the propylene is conducted to another catalytic unit containing an olefin disproportionation catalyst to produce substantial amounts of additional butene, as well as more ethylene. The resulting butene, after suitable separation, is recycled to the first catalytic unit for blending with additional isobutene and conversion to isoamylene. The hexenes and other heavier olefins can be rejected from the process or can be reacted with ethylene as described below. If desired, the ethylene can be converted to additional propylene, hereinafter described, for disproportionation with the remainder of the by-product propylene. In this embodiment, it is preferred that the propylene be converted to produce butene since the reaction of isobutene with butene-2 proceeds at a more rapid rate than the reaction of isobutene with propylene.

Although the exact nature of the various reactions which occur cannot be lineated precisely, it is believed that the isoamylenes are produced principally by the reaction of isobutene and normal butene, for example, butene-2. The exact operating conditions for each of the catalytic reactions depends upon the specific catalyst utilized, as well as other considerations while proceeding with the subsequent processing, as well as the exact composition of the feed.

In the operation of the invention as illustrated in FIG. 1, mixed normal and isobutenes are fed through pipe 11, combined with recycle butenes in pipe 12 and fed through pipe 13 into first olefin reactor 14. The effluent from reactor 14 is fed through pipe 16 and pipe 17 to separator 18. Ethylene is removed overhead from separator 18 through pipe 19. Propylene is passed through pipe 21 into second olefin reactor 22. The effluent from reactor 22, comprising ethylene and butene, as well as unconverted ethylene, is fed through pipe 23 for return through pipe 17 to separator 18. A third separated stream from separator 18, comprising $C_4$ and heavier olefins, is fed through pipe 24 to separator 26. The overhead stream from separator 26, comprising $C_4$, is returned through pipe 12 and pipe 13 to reactor 14. The product stream comprising isoamylene is removed through pipe 27 while any heavier olefins are removed through pipe 28.

If desired, the ethylene in pipe 19 can be converted to propylene, e.g., by a reaction as explained with respect to FIG. 2 below, or by dimerization, and returned to the system as propylene or butene. The hexenes and heavier in pipe 28 can be reacted together with ethylene from pipe 19 in an additional olefin reactor to produce olefins suitable for recycle.

In an example according to FIG. 1, a fixed bed catalyst of tungsten oxide supported on silica (8 weight percent $WO_3$-92 weight percent $SiO_2$) is maintained in reactor 14 wherein the reaction temperature is 750° F., the reaction pressure is 400 p.s.i.g., the weight hourly space velocity (WHSV) is 50 in pounds of reactant per pound of catalyst per hour. The catalyst bed comprises 1100 pounds of catalyst. In reactor 22, 800 pounds of the same catalyst material is maintained in a fixed bed, the reaction temperature is 725° F., the reaction pressure is 350 p.s.i.g., and the space velocity is 30 WHSV.

In a plant to produce 62,000 metric tons per year of isoamylenes, the composition and amounts of the various streams is given in the following table wherein the column headings refer to the pipe numbers in the drawings.

TABLE

| Moles/hour | 11 | 12 | 13 | 16 | 17 | 19 | 21 | 23 | 24 | 27 | 28 |
|---|---|---|---|---|---|---|---|---|---|---|---|
| Ethylene |  |  |  | 45 | 157 | 157 |  | 112 |  |  |  |
| Propylene |  |  |  | 225 | 562 |  | 562 | 228 |  |  |  |
| Isobutene | 240 | 240 | 480 | 240 | 240 |  |  |  | 240 |  |  |
| n-Butene | 193 | 327 | 520 | 220 | 327 |  |  | 107 |  |  |  |
| Isoamylene |  |  |  | 220 | 220 |  |  |  | 220 | 220 |  |
| n-Amylenes |  |  |  | 20 | 25 |  |  | 5 | 25 | 25 |  |
| $C_6$+ |  |  |  | 30 | 31 |  |  | 1 | 31 |  | 31 |
| Total | 433 | 567 | 1,000 | 1,000 | 1,562 | 157 | 562 | 562 | 832 | 245 | 31 |

In the operation of a system as illustrated in FIG. 1, it is preferred that the amount of 1-butene in the n-butene-isobutene feed to reactor 14 (pipe 13) is no more than about 5 percent by weight. Higher amounts of 1-butene increase the yield of n-amylene and $C_6$+ olefins. When paraffins are present in the feed, it is preferred that a feed stream of such paraffins be removed continuously to permit build-up in the recycle streams.

FIG. 2 illustrates an embodiment of the invention which is particularly suitable for use when the available feed stock is a mixture of isobutene and propylene. The isobutene-propylene mixture, preferably containing about 50 mole percent or more isobutene, is contacted with an olefin reaction catalyst under conditions suitable for producing substantial amounts of isoamylene in the olefin reactor. This reaction produces significant quantites of ethylene and, after suitable separation, the ethylene stream is conducted to an ethylene reaction zone. The ethylene reaction zone contains a catalyst, previously described, suitable for converting ethylene to propylene. Usually some additional n-butenes are produced. Both propylene and any n-butene are recycled to the olefin reaction zone where they are blended with additional isobutene and used to form more isoamylenes. Any isohexenes and other heavier olefins which might be formed in either of the catalytic units are rejected, or further converted by reacting in the presence of ethylene, as described hereinafter. By the reaction of isobutene and propylene, relatively few heavy by-products are produced and the isoamylenes contain a relatively small percentage of n-amylene impurities.

The system of FIG. 2 comprises olefin reactor 31, ethylene reactor 32, separator 33, separator 34, and connecting pipes. In an example of the invention as embodied in FIG. 2, in both reactor 31 and reactor 32 there is maintained a fixed bed of a tungsten oxide supported on silica catalyst (8 weight percent $WO_3$-92 weight percent $SiO_2$).

In reactor 31 the temperature is 840° F., the pressure is 375 p.s.i.g., and the weight hourly space velocity is 50. In reactor 32, the temperature is 820° F., the pressure is 450 p.s.i.g., and a gaseous hourly space velocity (GHSV) is 3600 vol./vol./hr.

A feed stream comprising isobutene and propylene is fed through pipe 36, combined with a recycle stream in pipe 37, and fed through pipe 38 into reactor 31. The effluent from reactor 31, comprising isoamylenes, ethylene, unconverted propylene and butenes, and a small amount of $C_6$ and heavier hydrocarbons, is removed through pipe 39 and passed through pipe 41 into separator 33. Ethylene is removed through pipe 42 and passed into ethylene reactor 32. The effluent from reactor 32, comprising propylene, some 1-butene and unconverted ethylene, is removed through pipe 43 and returned through pipe 41 to separator 33. The second separated stream from separator 32, comprising $C_3$ and heavier hydrocarbons, is passed through pipe 44 to separator 34. $C_3$ and $C_4$ hydrocarbons are removed overhead from separator 34 and returned through pipe 37 and pipe 38 to reactor 31. $C_5$ olefins, including isoamylene, are removed through pipe 46 while any $C_6$ and heavier olefins are removed through pipe 47.

In the embodiment of the invention as illustrated in FIG. 3, a mixed butene feed stream, containing substantial amounts of isobutene, is contacted with an olefin reaction catalyst under conditions to form isoamylenes in the olefin reactor. After separation of the effluent, ethylene and propylene, preferably in approximately equimolar amounts, are conducted to the dimerization reactor containing a dimerization catalyst under conditions to produce branched pentenes, as well as smaller amounts of other oligomers of ethylene and propylene. The effluent from the dimerization unit is separated, the isoamylenes being recovered and combined with the isoamylene product of the first unit while butenes are recycled to the first catalytic unit containing the olefin reaction catalyst, and the heavier olefins, such as branched hexenes, etc., are either rejected from the process or converted by reaction in the presence of ethylene in an olefin reaction zone, as hereinafter described. If necessary, excess quantities of ethylene can be removed from the process.

The embodiment of the invention as illustrated in FIG. 3 includes olefin reactor 51, dimerization reactor 52 and separators 53 and 54 along with connecting pipes. In an example of the invention as illustrated in FIG. 3, the olefin reactor contains a fixed bed of a tungsten oxide on silica olefin reaction catalyst (8 weight percent $WO_3$-92 weight percent $SiO_2$). The conditions of the reaction are 750° F., 400 p.s.i.g., and 50 WHSV. In the dimerization reactor, the catalyst is nickel oxide supported on silica-alumina (5 weight percent NiO-95 weight percent $SiO_2$—$Al_2O_3$). The conditions of the reaction are 250° F., 500 p.s.i.g. and 3 WHSV.

A mixed butene stream is fed through pipe 56 and pipe 57, along with recycle butenes through pipe 58, into reactor 51. The effluent from reactor 51 comprising ethylene, propylene, butenes, isoamylenes, and $C_6$ and heavier olefins, is removed through pipe 59 and passed through pipe 61 into separator 53. Ethylene is removed overhead through pipe 62 while a mixed stream of approximately equimolar amounts of ethylene and propylene is passed through pipe 63 into reactor 52. The effluent from reactor 52 comprising isoamylene, together with small amounts of other oligomers of ethylene or propylene, as well as unconverted ethylene and propylene, is removed through pipe 64 and returned through pipe 61 to separator 53. $C_3$ and heavier olefins separated in separator 53 are passed through pipe 66 into separator 54. $C_4$ olefins are removed overhead from separator 54 and passed through pipe 58 for return through pipe 57 to reactor 51. $C_5$ olefins, comprising product isoamylenes, are removed through pipe 67 while any $C_6$ and heavier olefins are removed through pipe 68.

In the invention as illustrated in FIG. 4, ethylene and $C_6+$ olefins are fed into an olefin reaction zone for the production of $C_3$–$C_5$ olefins which are recycled. The remainder of the system of FIG. 4 is similar to the system of FIG. 3. As shown in the drawing, the system of FIG. 4 comprises a first olefin reactor 71, a dimerization reactor 72, a second olefin reactor 73, and separators 74 and 76. In an example of the invention as illustrated in FIG. 4, the catalysts and conditions of reactors 71 and 72 are identical with the catalysts and conditions of reactors 51 and 52, respectively, of the invention as illustrated in FIG. 3. In reactor 73, the catalyst is a tungsten oxide on silica olefin reaction catalyst (8 weight percent $WO_3$–92 weight percent $SiO_2$), the temperature is 840° F., the pressure is 300 p.s.i.g., and the space velocity is 60 WHSV and the mol ratio of ethylene to $C_6+$ hydrocarbons are fed through pipes 83 and 93, respectively, is 3:1. If desired, a portion or all of the ethylene utilized in olefin reactor 73 can be replaced with propylene.

Mixed butenes are fed through pipe 77, combined with recycle $C_4$'s from pipe 78, and fed through pipe 79 into reactor 71. The effluent from reactor 71, comprising isoamylene, as well as ethylene, propylene, unconverted $C_4$ hydrocarbons, and $C_6$ and heavier olefins, is removed through pipe 81 and passed through pipe 82 into separator 74. Ethylene is removed overhead from separator 74 through pipe 83 and fed through pipe 84 into olefin reactor 73. Equimolar amounts of ethylene and propylene are removed through pipe 86 and fed to dimerization reactor 72, the effluent from reactor 72 being removed through pipe 87 and combined with the effluent from reactor 73 in pipe 88 and passed through pipes 89 and 82 to separator 74. $C_4$ and heavier olefins are removed from separator 74 through pipe 91 and passed to separator 76. $C_4$ olefins are removed from separator 76 through pipe 78 and returned through pipe 79 to reactor 71. $C_5$ olefins, comprising product isoamylene, are removed from separator 76 through pipe 92 while $C_6$ and heavier olefins are removed through pipe 93 and passed through pipe 84 into reactor 73. The effluent from reactor 73, as noted above, is passed through pipe 88 and returned through pipes 89 and 82 to separator 74.

It will be understood that various combinations of the invention can be utilized. For example, the propylene disproportionation as illustrated in FIG. 1 can be utilized in any system in which there is propylene which can profitably be converted to ethylene and butene. The ethylene reaction of FIG. 2 can be utilized in any system in which it is desired to convert ethylene to propylene. The co-dimerization as used in FIG. 3 and FIG. 4 can be utilized in any system in which it is desired to convert ethylene and $C_6$ and heavier olefins to produce additional amounts of $C_3$–$C_5$ olefins.

Because of the difficulty of separation, the isoamylenes product of the invention process will contain small amounts of n-amylenes. Nevertheless, such a product is entirely suitable for dehydrogenation to isoprene.

As noted, any small amount of paraffinic materials either formed during the process of the invention or fluid with the feed stream can be removed at any convenient point in the process. It is also sometimes advantageous to feed to the olefin reaction zone feed streams which have been deoiled, that is, which have had any materials heavier than the feed removal, for example, by distillation. In this way, the accummulation or carry-over of small amounts of materials which may poison or shorten the life of the catalyst is avoided.

The illustrations of the invention in the drawings and in the description in the specification are, of course, simplified. Many elements required in commercial operations have been eliminated including, for example, valves, controls, etc. Any suitable separation apparatus including larger or smaller numbers of separation vessels, different types of separation, etc., can be included within the separation zones.

I claim:
1. A process for converting a mixed feed stream comprising isobutene and a second reactant selected from n-butene and propylene to produce isoamylene, comprising the steps of:
    feeding said mixed stream into a first olefin reaction zone and producing therein isoamylene and a by-product selected from ethylene and propylene by the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said two new pairs being connected by an olefinic double bond;
    feeding said by-product into a second reaction zone and producing therein a useful olefin hydrocarbon having a larger number of carbon atoms per molecule than said by-products; and
    feeding said useful olefin hydrocarbon into a separation zone wherein
    said feed stream comprises isobutene and n-butene,
    said by-product comprises ethylene and propylene,
    said isoamylene and said by-products are separated in a first separation zone to produce a first separated stream comprising ethylene, a second separated stream comprising propylene, and a third separated stream comprising $C_4$ and heavier olefins,
    said second separated stream is fed to a second olefin reaction zone wherein said proplene is converted to produce additional ethylene and butene,
    the effluent from said second olefin reaction zone is returned to said first separation zone,
    said third separated stream is fed into a second separation zone and separated therein to produce a fourth separated stream comprising butene and a fifth separated stream comprising isoamylene, and
    said fourth separated stream is returned to said first olefin reaction zone.

2. A process for converting a mixed feed stream comprising isobutene and a second reactant selected from n-butene and propylene to produce isoamylene, comprising the steps of:
    feeding said mixed feed stream into a first olefin reaction zone and producing therein isoamylene and a by-product selected from ethylene and propylene by the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said two new pairs being connected by an olefinic double bond;
    feeding said by-product into a second reaction zone and producing therein a useful olefin hydrocarbon having a larger number of carbon atoms per molecule than said by-products; and
    feeding said useful olefin hydrocarbon into a separation zone wherein
    said feed stream comprises isobutene and propylene,
    said by-product is ethylene,
    said isoamylene and said ethylene are fed into a first separation zone and separated therein to produce a first separated stream comprising ethylene and a second separated stream,
    said first separated stream is fed into a second reaction zone wherein said ethylene is converted to produce propylene,
    the effluent from said second reaction zone is returned to said first separation zone,
    said second separated stream is passed into a second separation zone and separated therein to produce a third separated stream comprising propylene and a fourth separated stream comprising isoamylene, and
    said third separated stream is returned to said first olefin reaction zone.

3. A process for converting a mixed feed stream comprising isobutene and a second reactant selected from n-butene and propylene to produce isoamylene, comprising the steps of:
    feeding said mixed feed stream into a first olefin reaction zone and producing therein isoamylene and a by-product selected from ethylene and propylene by the olefin reaction which, as defined herein, can be visualized as comprising the reaction between two first pairs of carbon atoms, the two carbon atoms of each first pair being connected by an olefinic double bond, to form two new pairs from the carbon atoms of said first pair, the two carbon atoms of each of said two new pairs being connected by an olefinic double bond;
    feeding said by-product into a second reaction zone and producing therein a useful olefin hydrocarbon having a larger number of carbon atoms per molecule than said by-products; and
    feeding said useful olefin hydrocarbon into a separation zone wherein
    said feed stream comprises isobutene and n-butene,
    said by-product comprises ethylene and propylene,
    said isoamylene and said ethylene and propylene are separated in a first separation zone to produce a first separated stream comprising ethylene and propylene and a second separated stream,
    said first separated stream is fed into a dimerization zone wherein said ethylene and propylene are converted to produce additional isoamylene,
    the effluent from said dimerization zone is returned to said first separation zone,
    said second separated stream is fed into a second separation zone and separated therein to produce a third separated stream comprising olefins having a smaller number of carbon atoms per molecule than isoamylene and a fourth separated stream comprising isoamylene, and
    said third separated stream is returned to said first olefin reaction zone.

4. The process of claim 3 wherein:
    a fifth separated stream comprising olefin having a larger number of carbon atoms per molecule than amylene is removed from said second separation zone and converted together with ethylene in a second olefin reaction zone to produce additional amounts of olefin having a smaller number of carbon atoms per molecule than amylene.

5. A process for converting a mixed feed stream comprising isobutene and normal butene to produce isoamylene, comprising the steps of:
    feeding said mixed feed stream into a first olefin reaction zone and producing therein isoamylene and by-product propylene by the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said two new pairs being connected by an olefinic double bond;
    separating the effluent from said first olefin reaction zone in a first separation zone to produce a first separated stream comprising said by-product propylene and a second separated stream comprising heavier olefins;
    feeding said first separated stream into a second reaction zone and disproportionating propylene therein to produce additional butene;
    feeding the effluent from said second reaction zone into said first separation zone;

separating said second separated stream in a second separation zone to produce a third separated stream comprising amylene, a fourth separated stream comprising olefins lighter than amylene including butene and a fifth separated stream comprising $C_6$ and heavier olefins; and recycling said fourth separated stream to said first olefin reaction zone.

6. The process of claim 5 wherein ethylene and olefins having a larger number of carbon atoms than amylene are converted in a second olefin reaction zone to produce additional amounts of olefins having a smaller number of carbon atoms than amylene for recycle to said first olefin reaction zone.

7. A process for converting a mixed feed stream comprising isobutene and propylene to produce isoamylene, comprising the steps of:

feeding said mixed feed stream into a first olefin reaction zone and producing therein isoamylene and by-product ethylene by the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said two new pairs being connected by an olefinic double bond;

separating the effluent from said first olefin reaction zone in a first separation zone to produce a first separated stream comprising said by-product ethylene and a second separated stream comprising heavier olefins;

feeding said first separated stream into a second reaction zone and converting ethylene therein to produce additional propylene;

feeding the effluent from said second reaction zone into said first separation zone;

separating said second separated stream in a second separation zone to produce a third separated stream comprising amylene, a fourth separated stream comprising olefins lighter than amylene including propylene and a fifth separated stream comprising $C_6$ and heavier olefins; and recycling said fourth separated stream to said first olefin reaction zone.

8. A process for converting a mixed feed stream comprising isobutene and normal butene to produce isoamylenes, comprising the steps of:

feeding said mixed feed stream into a first olefin reaction zone and producing therein isoamylene and by-product ethylene and propylene by the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said two new pairs being connected by an olefinic double bond;

separating the effluent from said first olefin reaction zone in a first separation zone to produce a first separated stream comprising said by-product ethylene and propylene and a second separated stream comprising heavier olefins;

feeding said first separated stream into a second reaction zone and converting ethylene and propylene therein to produce additional isoamylene;

feeing the effluent from said second reaction zone into said first separation zone;

separating said second separated stream in a second separation zone to produce a third separated stream comprising amylene, a fourth separated stream comprising olefins lighter than amylene and a fifth separated stream comprising $C_6$ and heavier olefins; and recycling said fourth separated stream to said first olefin reaction zone.

9. A process for converting a mixed feed stream comprising isobutene and normal butene to produce isoamylene, comprising the steps of:

feeding said mixed feed stream into a first olefin reaction zone and producing therein isoamylene and by-product ethylene and propylene by the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said two new pairs being connected by an olefinic double bond;

separating the effluent from said first olefin reaction zone in a first separation zone to produce a first separated stream comprising said by-product ethylene and propylene and a second separated stream comprising heavier olefins;

feeding said first separated stream into a second reaction zone and converting ethylene and propylene therein to produce additional isoamylene;

feeding the effluent from said second reaction zone into said first separation zone;

separating said second separated stream in a second separation zone to produce a third separated stream comprising amylene, a fourth separated stream comprising olefins lighter than amylene and a fifth separated stream comprising $C_6$ and heavier olefins;

recycling said fourth separated stream to said first olefin reaction zone; and reacting said fifth separated stream in a second olefin reaction zone in the presence of ethylene to produce additional propylene and butene for recycle.

References Cited

UNITED STATES PATENTS

| | | | |
|---|---|---|---|
| 2,102,073 | 12/1937 | Ipatieff et al. | 260—683.15 |
| 3,261,879 | 7/1966 | Banks | 260—683 |
| 3,379,706 | 4/1968 | Wilke | 260—683.15 |
| 3,431,316 | 3/1969 | Banks | 260—683 |
| 3,457,320 | 7/1969 | Stapp et al. | 260—683 |

DELBERT E. GANTZ, Primary Examiner

C. E. SPRESSER, Jr., Assistant Examiner

U.S. Cl. X.R.

260—683.15